United States Patent
Kim et al.

(10) Patent No.: US 8,134,971 B2
(45) Date of Patent: Mar. 13, 2012

(54) METHOD AND SYSTEM FOR TRANSMITTING AND RECEIVING DATA IN A HETEROGENEOUS COMMUNICATION SYSTEM

(75) Inventors: Do-Young Kim, Yongin-si (KR);
Dong-Seek Park, Yongin-si (KR);
Ho-Kyu Choi, Seongnam-si (KR);
Sung-Kwon Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 828 days.

(21) Appl. No.: 12/074,306

(22) Filed: Mar. 3, 2008

(65) Prior Publication Data

US 2008/0219217 A1    Sep. 11, 2008

(30) Foreign Application Priority Data

Mar. 2, 2007    (KR) ........................ 10-2007-0020989

(51) Int. Cl.
*H04W 4/00*    (2009.01)
(52) U.S. Cl. .................... 370/331; 455/436; 455/439
(58) Field of Classification Search ................ 370/331, 370/395.2
See application file for complete search history.

(56) References Cited

U.S. PATENT DOCUMENTS

| 6,996,079 B1 * | 2/2006 | Bergenwall et al. .......... 370/331 |
| 2007/0021119 A1 | 1/2007 | Lee et al. | |
| 2007/0217427 A1 * | 9/2007 | Chung ...................... 370/395.2 |

FOREIGN PATENT DOCUMENTS

| KR | 10-2006-0037151 | 5/2006 |
| KR | 10-2006-0068416 | 6/2006 |
| KR | 10-2006-0134607 | 12/2006 |
| KR | 10-2007-0089377 | 8/2007 |

OTHER PUBLICATIONS

Office Action dated Dec. 17, 2009 in connection with Korean Patent Application No. 10-2007-0020989.

* cited by examiner

*Primary Examiner* — Albert T Chou (57) ABSTRACT

A method and system for transmitting/receiving data in a heterogeneous communication system. A terminal accesses a first controller of a first communication system supporting a first communication service to make a communication path to the first communication system. After making the communication path to the terminal, the first controller determines whether it is possible to provide the first communication service to the terminal over the first communication system. If it is not possible, the first controller transmits to an interworking unit a first request indicating that the terminal requires the first communication service over the second communication system. The interworking unit transmits a second request to a second controller of the second communication system in response to the first request, the second request indicating that the second controller provides the first communication service to the terminal. Upon receiving a response to the second request, the interworking unit controls the first controller to provide the first communication service to the terminal over the second communication system according to the response.

20 Claims, 9 Drawing Sheets

METHOD AND SYSTEM FOR TRANSMITTING AND RECEIVING DATA IN A HETEROGENEOUS COMMUNICATION SYSTEM

CROSS-REFERENCE TO RELATED APPLICATION(S) AND CLAIM OF PRIORITY

This application claims the benefit under 35 U.S.C. §119 (a) of a Korean Patent Application filed in the Korean Intellectual Property Office on Mar. 2, 2007 and assigned Ser. No. 2007-20989, the disclosure of which is incorporated herein by reference.

TECHNICAL FIELD OF THE INVENTION

The present invention relates generally to a communication system, and in particular, to a method and system for transmitting and receiving data in a heterogeneous communication system.

BACKGROUND OF THE INVENTION

In the next generation communication system, intensive research is being conducted to provide users with services having a high data rate and various high-capacity Qualities-of-Service (QoSs). Particularly, in the current next generation communication system, Orthogonal Frequency Division Multiplexing (OFDM) scheme or Orthogonal Frequency Division Multiple Access (OFDMA) scheme is used for a Broadband Wireless Access (BWA) communication system, such as Wireless Local Area Network (WLAN) system and Wireless Metropolitan Area Network (WMAN) system, both of which are Institute of Electrical and Electronics Engineers (IEEE) 802.11 communication systems. Therefore, intensive research is being carried out on a technology for supporting high-speed services in the form of guaranteeing mobility and QoS, and an example of its typical communication system includes an IEEE 802.16 communication system.

Figure 1:
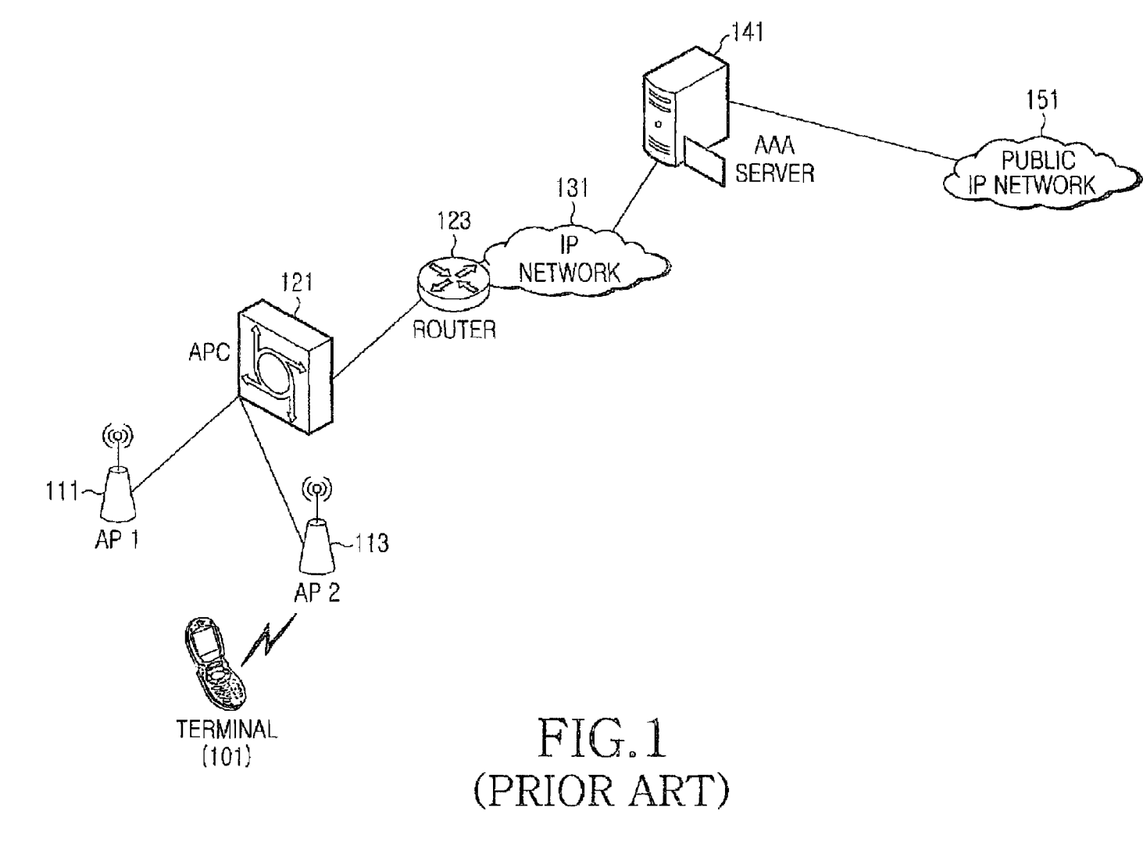
FIG. 1 is a diagram illustrating a configuration of a general IEEE 802.11 communication system.

With reference to FIG. 1, a description will now be made of a general IEEE 802.11 communication system.

FIG. 1 is a diagram illustrating a configuration of a general IEEE 802.11 communication system.

Referring to FIG. 1, the IEEE 802.11 communication system includes a terminal 101, access points (APs) of AP1 111 and AP2 113, an access point controller (APC) 121, a router 123, an Internet Protocol (IP) network 131, an Authentication, Authorization, Accounting (AAA) server 141, and a public IP network 151.

The AP1 111 and the AP2 113 are network equipments for processing a wireless access protocol with the terminal 101 that accesses the IEEE 802.11 communication system. The APC 121, network equipment for serving to control the AP1 111 and the AP2 113, provides an IEEE 802.11 communication service to the terminal 101 over the AP1 111 and the AP2 113 using the line.

The router 123 serves to perform a routing function for relaying between the APC 121 and the IP network 131, and the IP network 131 is a network for providing the IEEE 802.11 communication service to the terminal 101 that accesses the IEEE 802.11 communication system. The AAA server 141 performs authentication, authorization and accounting functions on the terminal 101 that accesses the communication system.

A description of the configuration of the general IEEE 802.11 communication system has been made so far with reference to FIG. 1. Next, with reference to FIG. 2, a description will be given of a configuration of a general IEEE 802.16 communication system.

Figure 2:
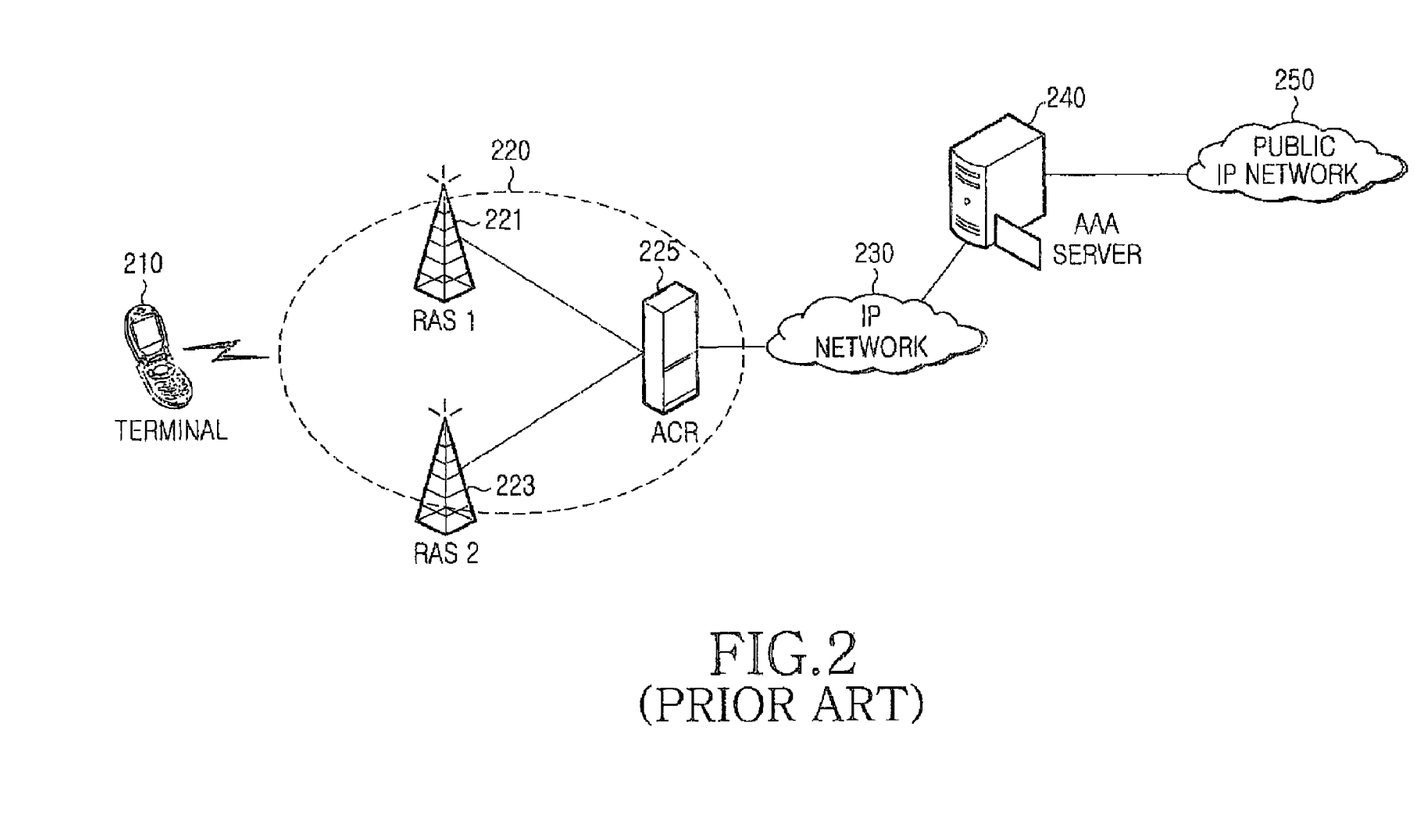
FIG. 2 is a diagram illustrating a configuration of a general IEEE 802.16 communication system.

FIG. 2 is a diagram illustrating a configuration of a general IEEE 802.16 communication system.

Referring to FIG. 2, the IEEE 802.16 communication system includes a terminal 210, Radio Access Stations (RASs) of RAS1 221 and RAS2 223 which constitute an Access Network (AN) 220, an Access Control Router (ACR) 225, an IP network 230, an AAA server 240, and a public IP network 250.

The RAS1 221 and the RAS2 223 are network equipments for processing a wireless access protocol with the terminal 210 that accesses the IEEE 802.16 communication system. The ACR 225 is network equipment for performing such functions as authentication, Medium Access Control (MAC) protocol processing, IP address allocation, and routing on the terminal 210 that accesses the communication system. The IP network 230 is a server for performing authentication, authorization and accounting functions on the terminal 210 that accesses the communication system.

A brief description of the configuration of the general IEEE 802.16 communication system has been made so far with reference to FIG. 2. Next, with reference to FIG. 3, a description will be made of a network configuration for service interworking between the IEEE 802.11 communication system and the IEEE 802.16 communication system.

Figure 3:
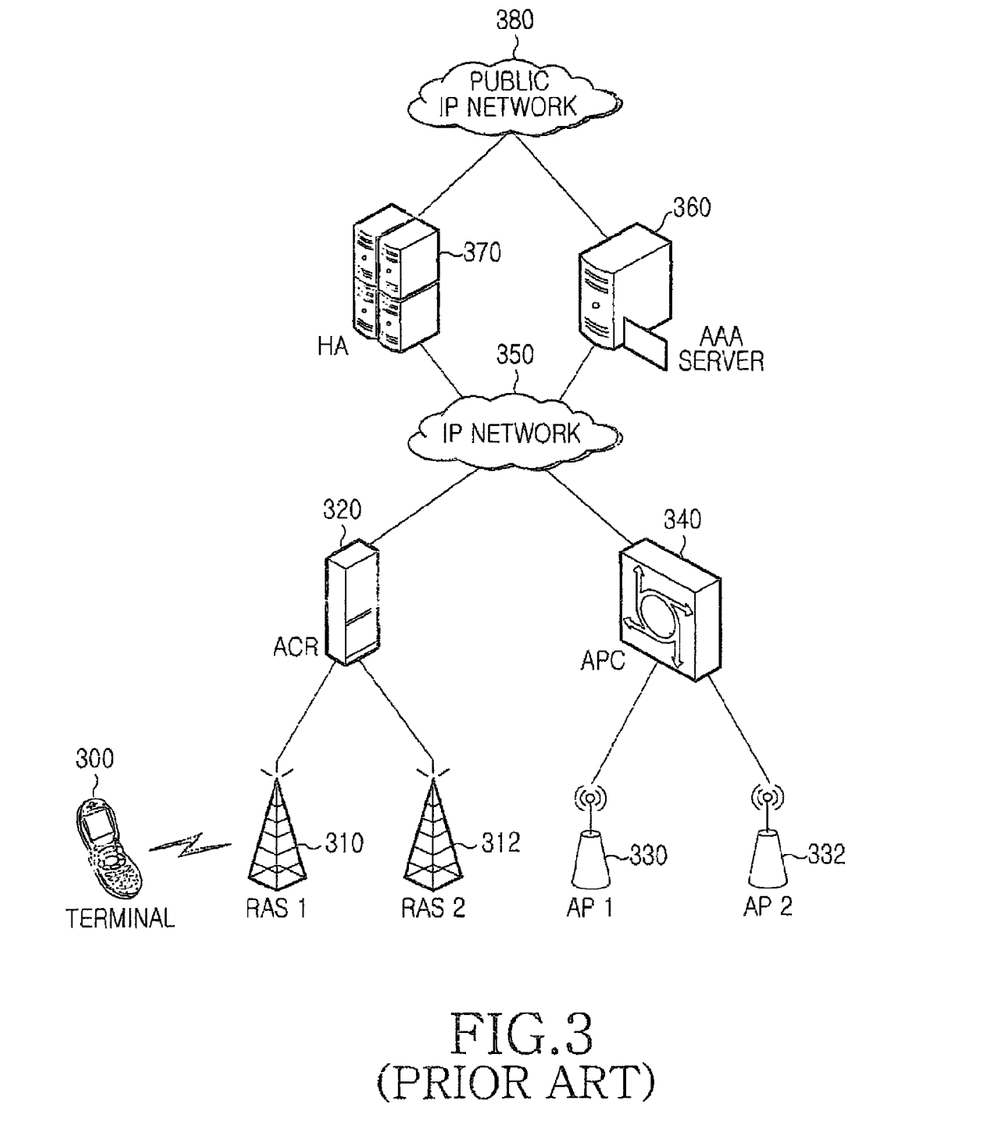
FIG. 3 is a diagram illustrating a network configuration for service interworking between a general IEEE 802.11 communication system and a general IEEE 802.16 communication system.

FIG. 3 is a diagram illustrating a network configuration for service interworking between a general IEEE 802.11 communication system and a general IEEE 802.16 communication system.

Referring to FIG. 3, the network configuration for service interworking between the communication systems includes RASs of RAS1 310 and RAS2 312 for processing a wireless access protocol with a terminal 300 accessing the IEEE 802.16 communication system; an ACR 320 for performing such functions as authentication, MAC protocol processing, IP address allocation, and routing on the terminal 300; APs of AP1 330 and AP2 332 for processing a wireless access protocol with the terminal 300 accessing the IEEE 802.11 communication system; an APC 340 for serving to control the AP1 330 and the AP2 332; an IP network 350 for providing the IEEE 802.16 communication service and the IEEE 802.11 communication service to the terminal 300; an AAA server 360 for performing authentication, authorization and accounting functions on the terminal 300 accessing the IEEE 802.16 communication system and the IEEE 802.11 communication system; a Home Agent (HA) 370 for performing a routing function for relaying between the IEEE 802.16 communication system and the IEEE 802.11 communication system; and a public IP network 380.

As described above, the network configuration should be prepared to provide both the IEEE 802.16 communication service and the IEEE 802.11 communication service to the terminal 300. To provide the foregoing services, there is a need for a scheme capable of seamlessly providing the services over the optimal wireless access network determined according to the position and service requirements of the terminal. In addition, when the terminal intends to perform handover between different communication systems, the scheme should assign Mobile IP to support handover. However, in order to perform handover as described above, the terminal should be assigned an address of Mobile IP from the public IP network 380. This is because the terminal may suffer from a time delay such as signaling delay and traffic delay during interworking between heterogeneous communication systems.

SUMMARY OF THE INVENTION

To address the above-discussed deficiencies of the prior art, it is a primary object of the present invention to address at least the problems and/or disadvantages and to provide at least the advantages described below. Accordingly, an aspect of the present invention is to provide a method and system for transmitting and receiving data in a heterogeneous communication system.

Another aspect of the present invention is to provide a data transmission/reception method and system for providing seamless services in a heterogeneous communication system.

Further another aspect of the present invention is to provide a data transmission/reception method and system in which a terminal can perform fast handover in a heterogeneous communication system.

Yet another aspect of the present invention is to provide a data transmission/reception method and system for allowing a base station to support heterogeneous systems rather than allowing the terminal to support heterogeneous systems in a heterogeneous communication system.

Still another aspect of the present invention is to provide a method and system for allowing a terminal to transmit/receive data using its own network, or even though it belongs to another network, to transmit/receive data adaptively using its own network or another network according to the communication environment in a heterogeneous communication system.

According to one aspect of the present invention, there is provided a method for transmitting and receiving data in a heterogeneous communication system. The method includes accessing, by a terminal, a first controller of a first communication system providing a first communication service, to make a communication path to the first communication system; after making the communication path to the terminal, determining by the first controller whether it is possible to provide the first communication service to the terminal over the first communication system; when it is not possible to provide the first communication service to the terminal over the first communication system, transmitting by the first controller to an interworking unit a first request indicating that the terminal requires to receive the first communication service over the second communication system; transmitting, by the interworking unit, a second request to a second controller of the second communication system in response to the first request, the second request indicating that the second controller requires to provide the first communication service to the terminal; and upon receiving a response to the second request from the second controller, controlling by the interworking unit the first controller to provide the first communication service to the terminal over the second communication system according to the response.

According to another aspect of the present invention, there is provided a system for transmitting and receiving data in a heterogeneous communication system. The system includes a terminal; a first controller of a first communication system providing a first communication service; a second controller of a second communication system; and an interworking unit. The terminal accesses the first controller to make a communication path to the first communication system. After making the communication path to the terminal, the first controller determines whether it is possible to provide the first communication service to the terminal over the first communication system, and when it is not possible to provide the first communication service to the terminal over the first communication system, the first controller transmits to the interworking unit a first request indicating that the terminal requires to receive the first communication service over the second communication system. The interworking unit transmits a second request to the second controller in response to the first request, the second request indicating that the second controller requires to provide the first communication service to the terminal, and upon receiving a response to the second request from the second controller, the interworking unit controls the first controller to provide the first communication service to the terminal over the second communication system according to the response.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention provides a method and system for transmitting and receiving data in a heterogeneous communication system. Although a description of the present invention will be given with reference to an Institute of Electrical and Electronic Engineers (IEEE) 802.16 communication system and an IEEE 802.11 communication system as heterogeneous systems, by way of example, the data transmission/reception method and system proposed by the present invention can also be applied to other heterogeneous communication systems.

In addition, the present invention provides a data transmission/reception method and system capable of seamlessly providing a communication service when an arbitrary terminal moves to another communication system while receiving a service from one communication system, in a heterogeneous system including a first communication system, e.g., 802.16 communication system, and a second communication system, e.g., 802.11 communication system.

Further, the present invention provides a data transmission/reception method and system for providing a service of a first communication system to an arbitrary terminal over a second communication system, when a load occurs in the first communication system from which the terminal intends to receive the service.

Figure 4A:
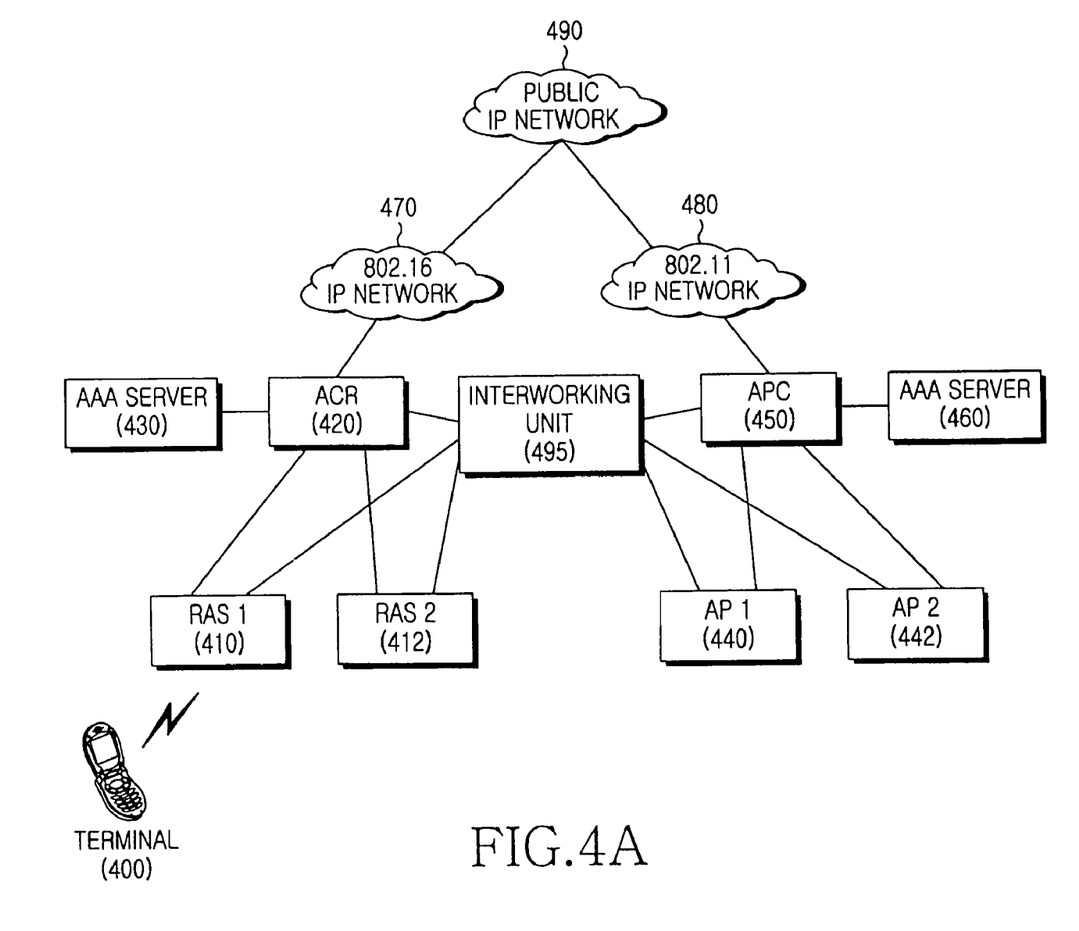
FIG. 4A is a diagram illustrating a network configuration for data transmission/reception in a heterogeneous communication system according to an embodiment of the present invention.

With reference to FIG. 4A, a description will now be made of a network configuration for service interworking between an IEEE 802.11 communication system and an IEEE 802.16 communication system in a heterogeneous communication system according to an embodiment of the present invention.

FIG. 4A is a diagram illustrating a network configuration for data transmission/reception in a heterogeneous communication system according to an embodiment of the present invention. Shown in FIG. 4A is a network configuration for service interworking between an IEEE 802.11 communication system and an IEEE 802.16 communication system.

Referring to FIG. 4A, the network configuration for service interworking includes an IEEE 802.16 communication system and an IEEE 802.11 communication system. A description of an embodiment of the present invention will be given for an exemplary case where a terminal moves to a second communication system, e.g., IEEE 802.11 communication system, while receiving a service from a first communication system, e.g., IEEE 802.16 communication system, to which it is now connected. In this exemplary case, the terminal can access both the IEEE 802.16 communication system and the IEEE 802.11 communication system.

The network configuration includes Radio Access Stations (RASs) of RAS1 410 and RAS2 412 for processing a wireless access protocol with a terminal 400 accessing the IEEE 802.16 communication system and for serving as base stations, an Access Control Router (ACR) 420 for performing such functions as authentication, Medium Access Control (MAC) protocol processing, Internet Protocol (IP) address allocation, and routing on the terminal 400, an Authentication Authorization Accounting (AAA) server 430 for performing authentication, authorization and accounting functions on the terminal 400 accessing the IEEE 802.16 communication system, and an IP network 470 for providing the IEEE 802.16 communication service to the terminal 400.

Further, the network configuration includes APs of AP1 440 and AP2 442 for processing a wireless access protocol with the terminal 400 accessing the IEEE 802.11 communication system and for serving as base stations, an APC 450 for serving to control the APs 440 and 442, an AAA server 460 for performing authentication, authorization and accounting functions on the terminal 400 accessing the IEEE 802.11 communication system, and an IP network 480 for providing the IEEE 802.11 communication service to the terminal 400. In addition, the network configuration includes a public IP network 490 for providing the IEEE 802.16 service and the IEEE 802.11 service, and an interworking unit 495 for interworking between the IEEE 802.16 communication system and the IEEE 802.11 communication system. The interworking unit 495 can be included in the ACR and/or APC. Alternatively, as shown in FIG. 4A, the interworking unit 495 can be provided separately from the ACR and the APC. A detailed description of the interworking unit 495 will be given below.

In such heterogeneous communication systems, i.e., IEEE 802.16 communication system and IEEE 802.11 communication system, the network elements for data transmission/reception are equal to those described in FIGS. 1 and 2. Therefore, the following description will be focused on the interworking unit 495 newly proposed by the present invention. For convenience, the following description will be given for the exemplary case where the terminal 400 first receives a first communication service over the RAS1 410.

When the terminal 400 accesses the first communication system to receive a first communication service, it receives the first communication service over the RAS1 410 and the ACR 420.

If a load occurs in the first communication system while the terminal 400 is receiving the first communication service, the terminal 400 accesses the second communication system in order to receive the first communication service over the second communication system. In this case, the terminal 400 receives the service over the RAS1 410 that provides the first communication service over the AP1 440 and the APC 450 (or the AP2 442 and the APC 450) and the interworking unit 495.

If the terminal 400 performs handover with an intention to receive the second communication service while receiving the first communication service, the terminal 400 performs handover to the second communication system using the intact IP address allocated from the first communication system.

In this case, the RAS and the AP each have a physical layer structure and a MAC layer structure supporting heterogeneous devices.

Next, the following description will be made for the exemplary case where the terminal 400 receives the second communication service over the AP1 440.

When the terminal 400 accesses the second communication system to receive the second communication service, the terminal 400 receives the second communication service over the AP1 440 and the APC 450.

If a load occurs in the second communication system while the terminal 400 is receiving the second communication service, the terminal 400 receives the second communication service over the first communication system. That is, the terminal 400 accesses the first communication system, and receives the service over the APC 450 that provides the second communication service over the RAS1 410 and the ACR 420 (or the RAS2 412 and the ACR 420) and the interworking unit 495.

The RAS1 410, RAS2 412, AP1 440 and AP2 442 each include elements capable of supporting both the first communication system and the second communication system. Therefore, in the case where the terminal 400 accesses the first communication system to receive the first communication service, even though Mobile IP allocation is impossible due to the load occurred in the ACR 420, RAS1 410 and RAS2 412 which are providing the first communication service, the terminal 400 can receive the first communication service over the second communication system. Specifically, the terminal 400 can receive the first communication service over the APC 450 by way of the RAS1 410 (or the RAS2 412) and the interworking unit 495.

Also, in the case where the terminal 400 accesses the second communication system to receive the second communication service, even though Mobile IP allocation is impossible due to the load occurred in the APC 450, AP1 440 and AP2 442 which are providing the second communication service, the terminal 400 can receive the second communication service over the first communication system. Specifically, the terminal 400 can receive the second communication service over the ACR 420 by way of the AP1 440 (or the AP2 442) and the interworking unit 495.

Figure 4B:
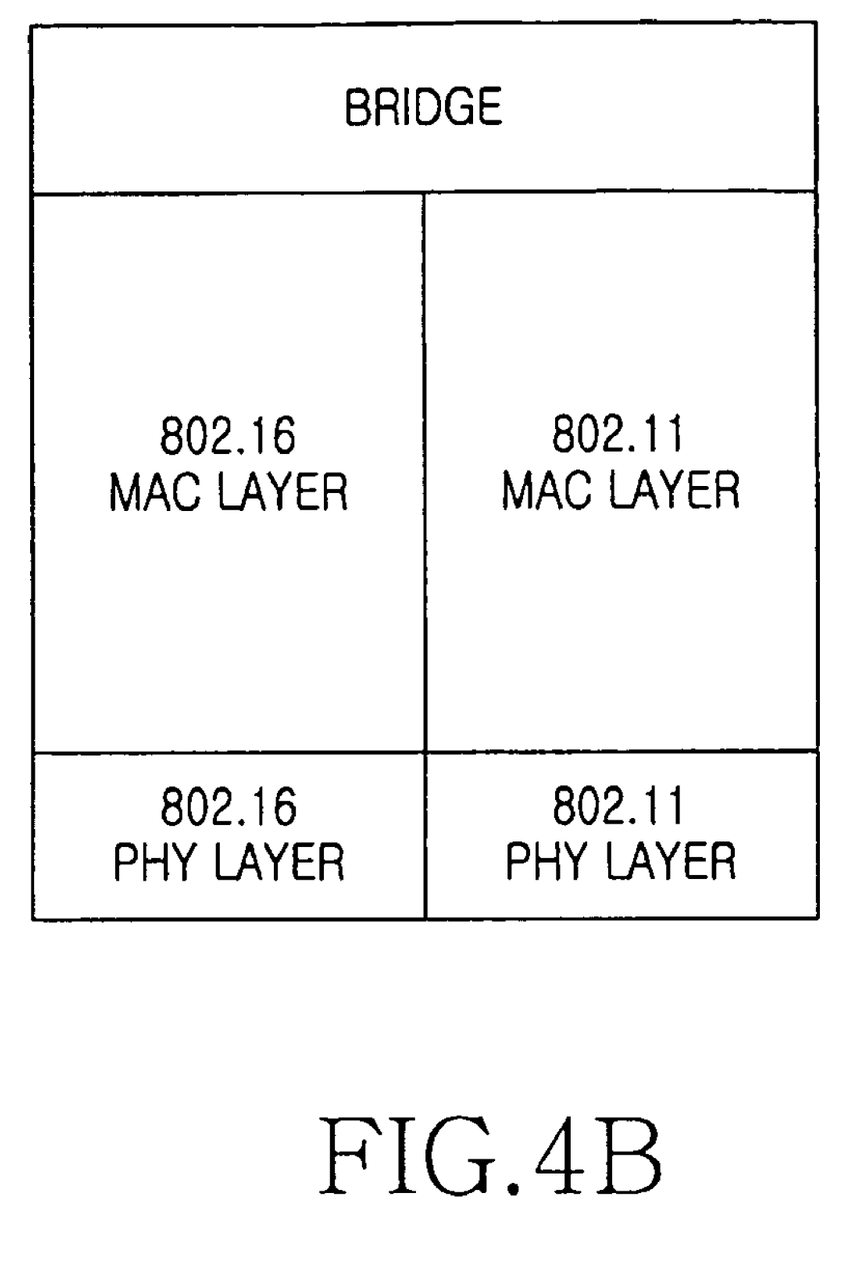
FIG. 4B is a diagram illustrating an interworking unit apparatus in a heterogeneous communication system according to an embodiment of the present invention.

With reference to FIG. 4B, a description will now be made of a function of the interworking unit 495 for data transmission/reception in the heterogeneous communication system according to an embodiment of the present invention.

FIG. 4B is a diagram illustrating an interworking unit apparatus in a heterogeneous communication system according to an embodiment of the present invention.

Referring to FIG. 4B, since the interworking unit 495 can support both the IEEE 802.16 communication system and the IEEE 802.11 communication system as described above, it should have wireless access protocols of both the IEEE 802.16 communication system and the IEEE 802.11 communication system. In addition, the interworking unit 495 has a function of detecting signals of an arbitrary terminal that desires to access the system, for example, the IEEE 802.16 communication system, from which it intends to receive the service, or a function of detecting signals of a terminal intending to access the IEEE 802.11 communication system. Therefore, upon detecting signals of the system from which the arbitrary terminal desires to receive the service, the interworking unit 495 provides the service according to the signals desired by the terminal.

The interworking unit 495 is divided into layers available by the 802.11 communication system and layers available by the 802.16 communication system. For example, when a signal of the terminal intending to receive the 802.11 communication service is received, a bridge included in the interworking unit bridges it to the layers supporting the 802.11 communication system, and when a signal of the terminal intending to receive the 802.16 communication service is received, the bridge included in the interworking unit bridges it to the layers supporting the 802.16 communication system.

A description of the network elements for data transmission/reception in the heterogeneous communication system according to an embodiment of the present invention has been made so far with reference to FIGS. 4A and 4B. Next, with reference to FIG. 5, a description will be made of a process in which a terminal accesses the IEEE 802.16 communication system according to an embodiment of the present invention.

Figure 5:
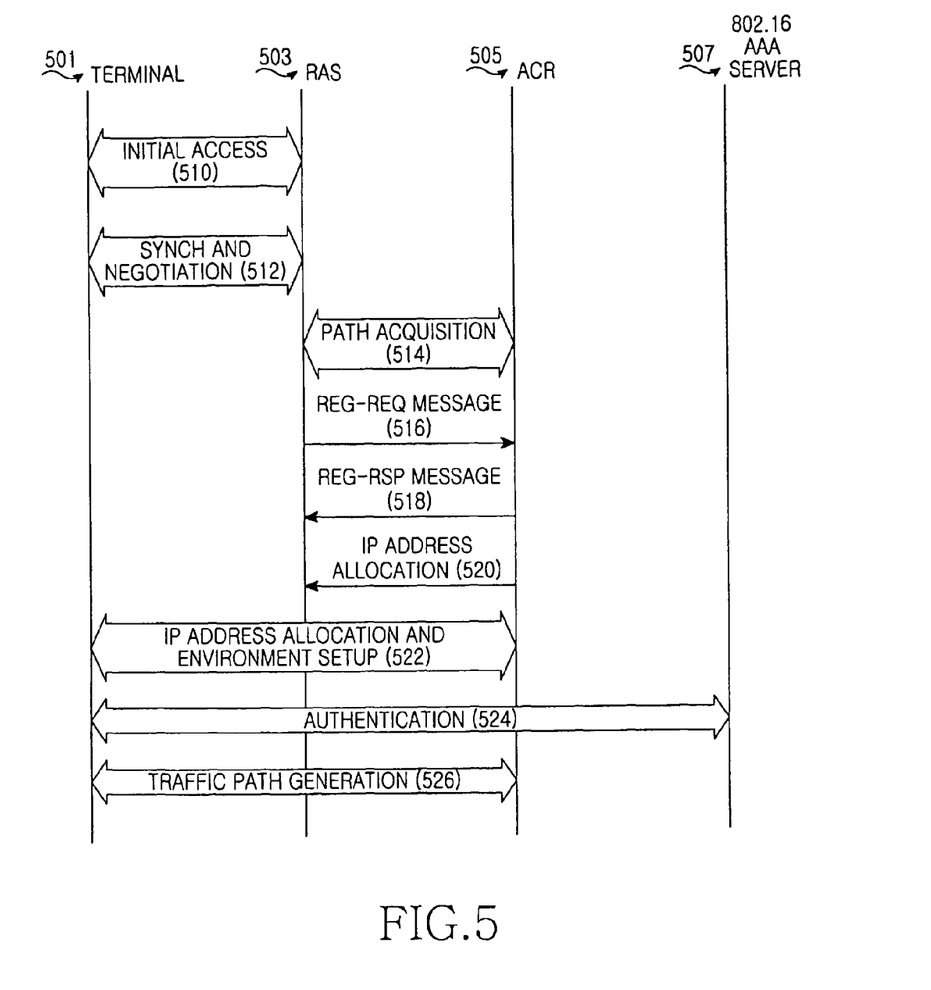
FIG. 5 is a diagram illustrating a process in which a terminal accesses an IEEE 802.16 communication system according to an embodiment of the present invention.

FIG. 5 is a diagram illustrating a process in which a terminal accesses an IEEE 802.16 communication system according to an embodiment of the present invention.

A terminal 501 searches for a RAS of the IEEE 802.16 communication system where it is now located (Step 510). If a specific RAS of the IEEE 802.16 communication system is searched, the terminal 501 matches its synchronization with the searched RAS 503 (Step 512). The RAS 503, which is synchronized with the terminal 501, acquires a path (route) to an ACR 505 (Step 514). Thereafter, the terminal 501 generates a Registration Request (REG-REQ) message and delivers it to the ACR 505 over the RAS 503 (Step 516). Upon receiving the REG-REQ message, the ACR 505 transmits a request for a user profile to an AAA server 507 to acquire the user profile. Then the ACR 505 generates a Registration Response (REG-RSP) message and delivers the REG-RSP message to the RAS 503 (Step 518).

After delivering the REG-RSP message, the ACR 505 performs an IP address allocation procedure (Step 520). The terminal 501 is allocated an IP address by means of the ACR 505, and performs environment setup according to the allocated IP address (Step 522). Next, the terminal 501 performs an access authentication process with the AAA server 507 (Step 524). Through this procedure, the terminal 501 is connected to the IEEE 802.16 communication system, and a subscriber receives the IEEE 802.16 communication service over the connected terminal 501.

A description of the process in which the terminal accesses the IEEE 802.16 communication system in the communication system according to an embodiment of the present invention has been made with reference to FIG. 5. Next, with reference to FIG. 6, a description will be made of a process in which a terminal accesses the IEEE 802.11 communication system in a communication system according to an embodiment of the present invention.

Figure 6:
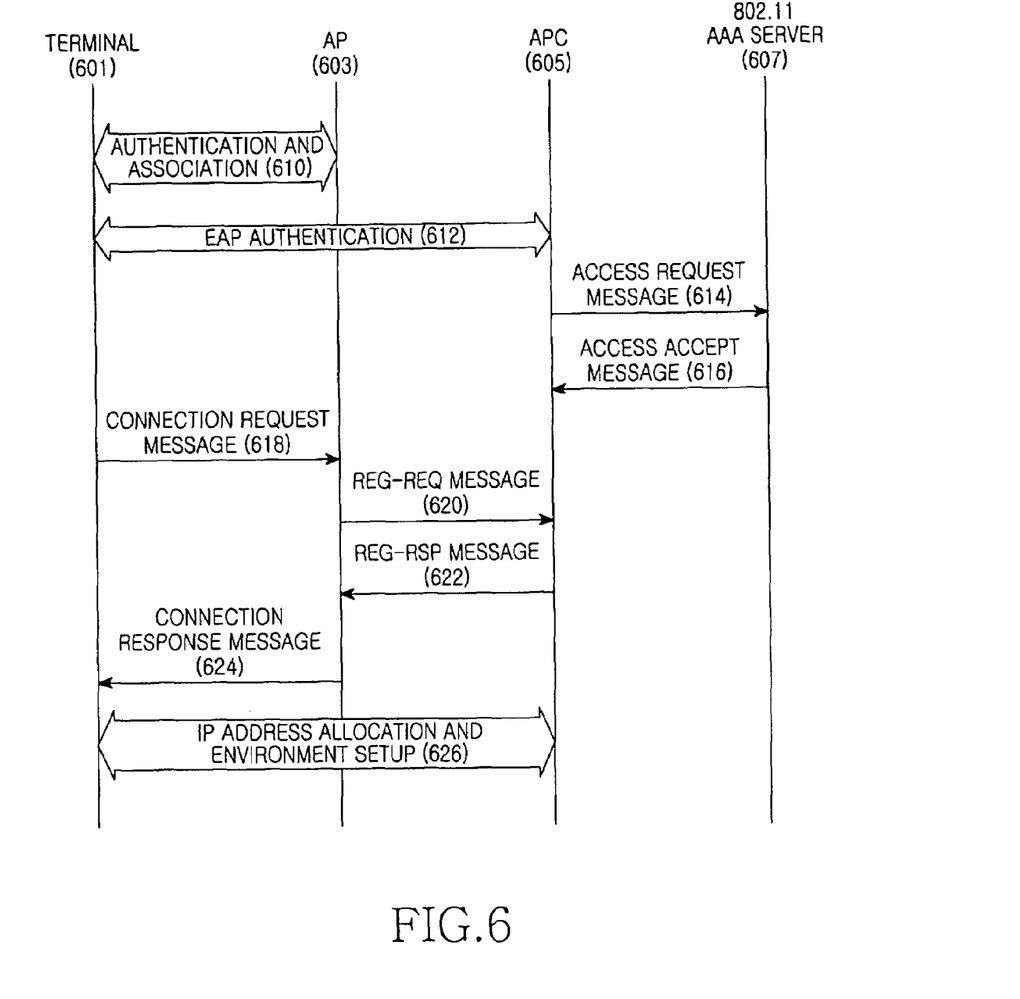
FIG. 6 is a diagram illustrating a process in which a terminal accesses an IEEE 802.11 communication system in a communication system according to an embodiment of the present invention.

FIG. 6 is a diagram illustrating a process in which a terminal accesses an IEEE 802.11 communication system in a communication system according to an embodiment of the present invention.

A terminal 601 searches for an AP of the IEEE 802.11 communication system where it is now located. When a specific AP of the IEEE 802.11 communication system is searched, the terminal 601 performs synchronization with the searched AP 603, and performs an authentication and association procedure on the terminal 601 according to a wireless access protocol defined by the IEEE 802.11 communication system (Step 610). Next, the terminal 601 performs an Extensible Authentication Protocol (EAP) process with an APC 605 (Step 612). The APC 605, after performing the EAP process, transmits an Access Request message to an AAA server 607 (Step 614). The AAA server 607 determines whether the access can be made according to the Access Request message, and then transmits to the APC 605 an Access Response message including the accessibility (Step 616).

Next, the terminal 601 transmits a Connection Request message to the AP 603 (Step 618). Upon receiving the Connection Request message, the AP 603 transmits an REG-REQ message to the APC 605 (Step 620). The APC 605 generates an REG-RSP message corresponding to the REG-REQ message, and transmits the generated REG-RSP message to the AP 603 (Step 622). Upon receiving the REG-RSP message, the AP 603 generates a Connection Response message and transmits it to the terminal 601 (Step 624). The terminal 601 is allocated an IP address from the APC 605, and performs environment setup according to the allocated IP address (Step 626). Through this procedure, the terminal 601 is connected to the IEEE 802.11 communication system, and a subscriber receives the IEEE 802.11 communication service over the connected terminal 601.

A description of the process in which the terminal accesses the IEEE 802.11 communication system in the communication system according to an embodiment of the present invention has been given with reference to FIG. 6. Next, with reference to FIG. 7, a description will be made of a process in which a terminal accesses an IEEE 802.16 communication system and receives a service from an IEEE 802.11 communication system through an interworking unit in the communication system according to an embodiment of the present invention.

Figure 7:
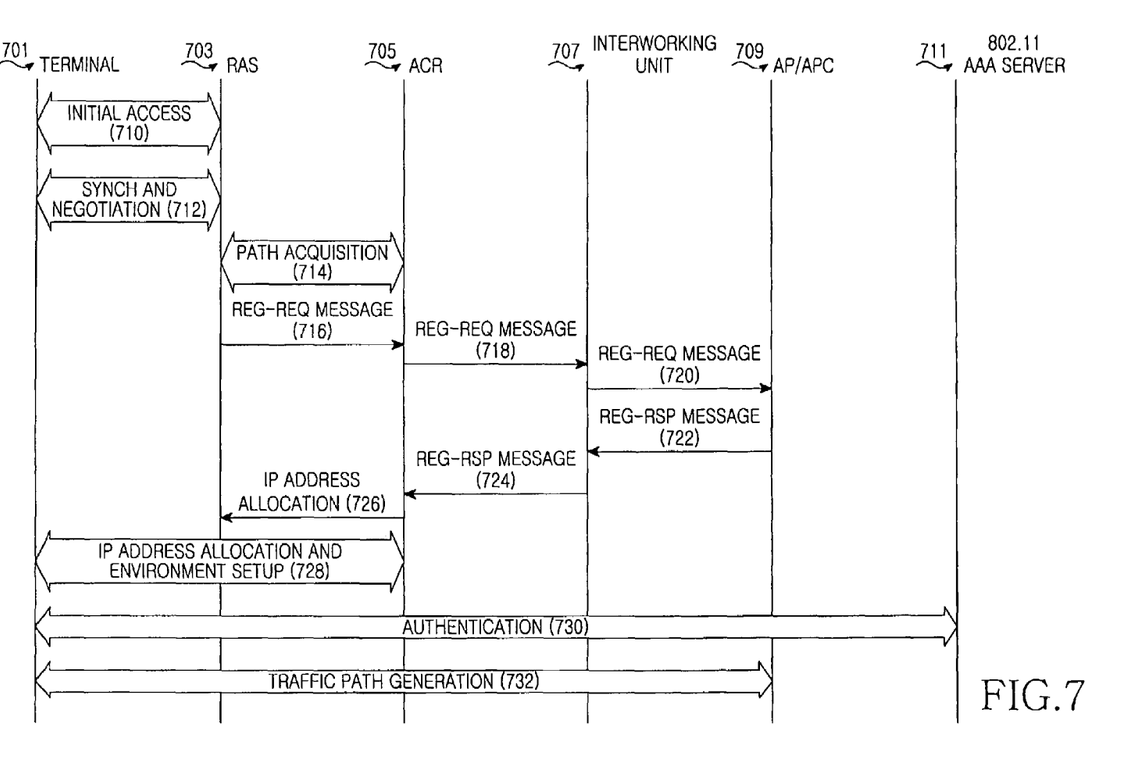
FIG. 7 is a diagram illustrating a process of providing a service through an interworking unit in a communication system according to an embodiment of the present invention.

FIG. 7 is a diagram illustrating a process of providing a service through an interworking unit in a communication system according to an embodiment of the present invention.

A terminal 701 searches for a RAS of the IEEE 802.16 communication system where it is now located (Step 710). When a specific RAS of the IEEE 802.16 communication system is searched, the terminal 701 matches its synchronization with the searched RAS 703 (Step 712). The RAS 703, which is synchronized with the terminal 701, acquires a path to an ACR 705 (Step 714). Thereafter, the terminal 701 generates an REG-REQ message and transmits it to the ACR 705 over the RAS 703 (Step 716). In this case, if load traffic has occurred in the RAS 703 or allocation of an IP address is impossible, the ACR 705, which has received the REG-REQ message, forwards the REG-REQ message to an interworking unit 707 (Step 718). Then the interworking unit 707 forwards the REG-REQ message to an AP/APC 709 (Step 720). Upon receiving the REG-REQ message, the AP/APC 709 determines its acceptability of the terminal 701, and transmits a request for a user profile to an AAA server 711 to acquire the user profile. Then the AP/APC 709 generates an REG-RSP message and transmits it to the interworking unit 707 (Step 722), and the interworking unit 707 forwards the REG-RSP message to the ACR 705 (Step 724).

Upon receiving the REG-RSP message, the ACR 705 performs an IP address allocation procedure (Step 726). The terminal 701 is allocated an IP address by means of the ACR 705, and performs environment setup according to the allocated IP address (Step 728). Next, the terminal 701 performs an access authentication process with the AAA server 711 (Step 730). Through this procedure, the terminal 701 is connected to the IEEE 802.16 communication system by way of the AP/APC 709 that manages the IEEE 802.11 communication system, and a subscriber receives the IEEE 802.16 communication service over the connected terminal 701.

A description of the process in which the terminal accesses the IEEE 802.16 communication system and receives the IEEE 802.16 service from the IEEE 802.11 communication system through the interworking unit in the communication system according to an embodiment of the present invention has been made with reference to FIG. 7. Next, with reference to FIG. 8, a description will be made of a process in which a terminal accesses an IEEE 802.11 communication system and receives an IEEE 802.11 service from an IEEE 802.16 communication system through an interworking unit in a communication system according to an embodiment of the present invention.

Figure 8:
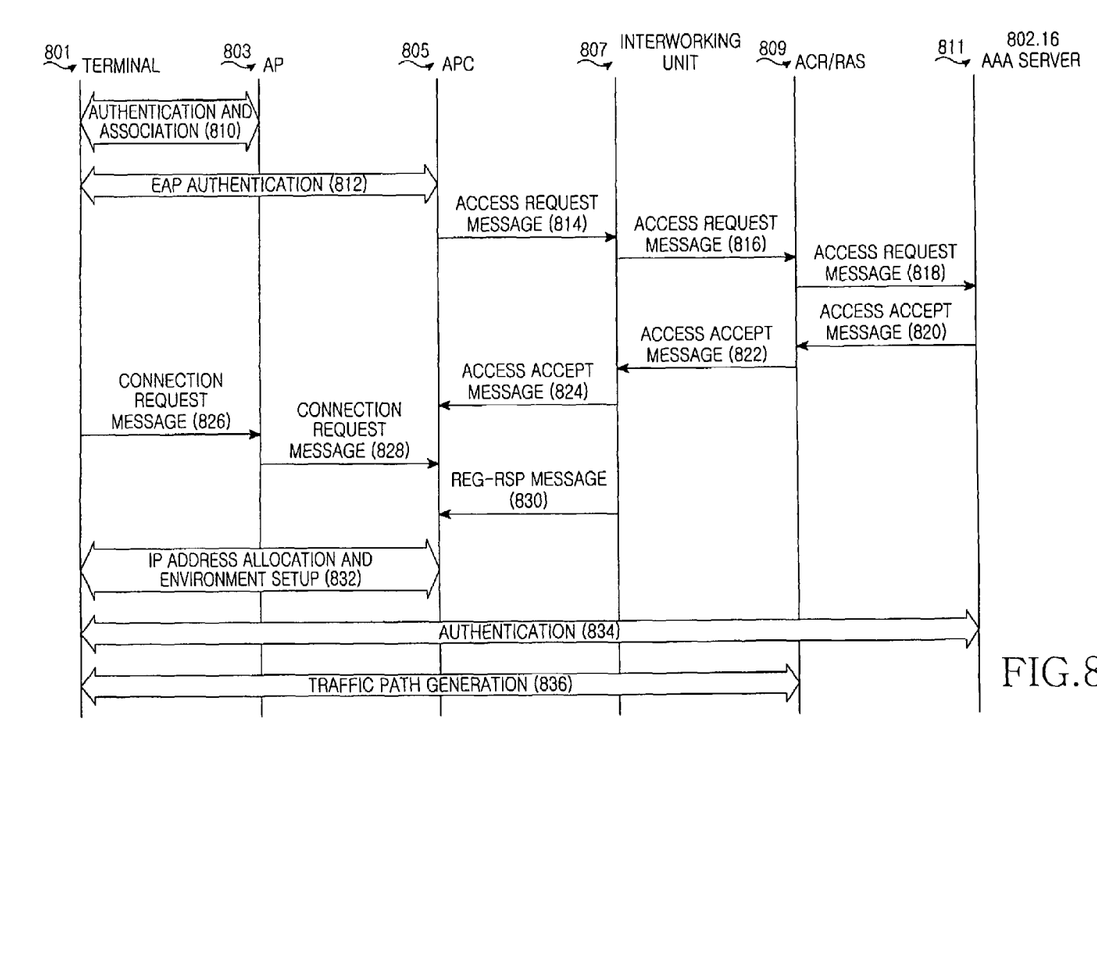
FIG. 8 is a diagram illustrating a process of providing a service through an interworking unit in a communication system according to an embodiment of the present invention.

FIG. 8 is a diagram illustrating a process of providing a service through an interworking unit in a communication system according to an embodiment of the present invention.

A terminal 801 searches for an AP of the IEEE 802.11 communication system where it is now located. When a specific AP of the IEEE 802.11 communication system is searched, the terminal 801 performs synchronization with the searched AP 803, and performs an authentication and association procedure on the terminal 801 according to a wireless access protocol defined by the IEEE 802.11 communication system (Step 810). Next, the terminal 801 performs an EAP authentication process with an APC 805 (Step 812). In this case, if load traffic has occurred in the AP 803, or allocation of an IP address is impossible, the APC 805 transmits an Access Request message to an interworking unit 807 (Step 814). The interworking unit 807, which has received the Access Request message, forwards the Access Request message to an ACR/RAS 809 (Step 816). Then the ACR/RAS 809 forwards the Access Request message to an AAA server 811 (Step 818). The AAA server 811 determines whether the access can be made according to the Access Request message, and then transmits to the ACR/RAS 809 an Access Response message including the accessibility (Step 820). The ACR/RAS 809 forwards the Access Response message to the interworking unit 807 and the APC 805 (Steps 822 and 824).

Next, the terminal 801 transmits a Connection Request message to the AP 803 (Step 826). Upon receiving the Connection Request message, the AP 803 forwards the Connection Request message to the APC 805 (Step 828). Upon receiving an REG-RSP message from the interworking unit 807 (Step 830), the APC 805 allocates an IP address to the terminal 801 and performs environment setup according to the IP address (Step 832). Next, the terminal 801 performs an access authentication process with the AAA server 811 (Step 834). Through this process, the terminal 801 is connected to the IEEE 802.11 communication system by way of the ACR/RAS 809 that manages the IEEE 802.16 communication system, and a subscriber receives the IEEE 802.11 communication service over the connected terminal 801.

Although not illustrated in the drawings, even when the terminal performs handover from the 802.11 communication system to the 802.16 communication system, the present invention can perform handover rapidly without service drop, enabling stable data transmission/reception.

As is apparent from the foregoing description, according to the present invention, the base station in the heterogeneous communication system is equipped with the interworking unit supporting the heterogeneous mode, thereby facilitating data transmission/reception without service drop. In addition, the terminal can enable data transmission/reception without service drop even during handover.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a first communication service by a first controller of a first communication system in a heterogeneous communication system, the method comprising:

if a communication path for providing the first communication service to a terminal is generated, determining whether a load of traffic occurs in the first communication system providing the first communication service;

if the load of traffic occurs in the first communication system, transmitting a first request message indicating that the terminal is required to receive the first communication service over a second communication system, to an interworking unit configured to perform interworking between the first communication system and the second communication system providing a second communication service, the interworking unit comprising a medium access control (MAC) layer and a physical layer associated with each of the first and second communication systems, and a bridge configured to connect the MAC layer and the physical layer associated with one of the first and second communication systems;

receiving a response message corresponding to the first request message from the interworking unit; and allocating an internet protocol (IP) address of the second communication system to the terminal according to the response message.

2. The method of claim 1, wherein the first request message is a registration request message, and the response message is a registration response message.

3. The method of claim 1, further comprising:
if the load of traffic does not occur in the first communication system, allocating an IP address of the first communication system to the terminal and providing the first communication service to the terminal; and
if a second request message for receiving the second communication service from the second communication system is received from the terminal while providing the first communication service to the terminal, controlling the terminal to perform a handover to the second communication system using the IP address of the first communication system.

4. The method of claim 1, wherein the first communication system is an IEEE 802.11 communication system and the second communication system is an IEEE 802.16 communication system.

5. The method of claim 1, wherein the controller of the first communication system comprises an access point controller.

6. An apparatus for providing a communication service in a heterogeneous communication system, the apparatus comprising:
a controller configured to determine whether a load of traffic occurs in a first communication system providing a first communication service, if a communication path for providing the first communication service to a terminal is generated;
a transmitter configured to transmit a first request message indicating that the terminal is required to receive the first communication service over a second communication system, to an interworking unit configured to perform interworking between the first communication system and the second communication system providing a second communication service, if the load of traffic occurs in the first communication system, the interworking unit comprising a medium access control (MAC) layer and a physical layer associated with each of the first and second communication systems, and a bridge connecting the MAC layer and the physical layer associated with one of the first and second communication systems;
a receiver configured to receive a response message corresponding to the first request message from the interworking unit; and
an allocator configured to allocate an internet protocol (IP) address of the second communication system to the terminal according to the response message.

7. The apparatus of claim 6, wherein the first request message is a registration request message, and the response message is a registration response message.

8. The apparatus of claim 6, wherein the allocator allocates an IP address of the first communication system to the terminal and provides the first communication service to the terminal, if the load of traffic does not occur in the first communication system, and wherein the controller controls the terminal to perform a handover to the second communication system using the IP address of the first communication system, if a second request message for receiving the second communication service from the second communication system is received from the terminal while providing the first communication service to the terminal.

9. The apparatus of claim 6, wherein the first communication system is an IEEE 802.11 communication system and the second communication system is an IEEE 802.16 communication system.

10. The apparatus of claim 6, wherein the controller of the first communication system comprises an access point controller.

11. A method for providing a communication service by an interworking unit in a heterogeneous communication system, the method comprising:
if a load of traffic occurs in a first communication system providing a first communication service, receiving a first request message indicating that a terminal is required to receive the first communication service over a second communication system providing a second communication service, from a first controller of the first communication system;
transmitting a second request message to a second controller of the second communication system, the second request message indicating that the second controller is required to provide the first communication service to the terminal;
if a response message corresponding to the second request message is received from the second controller, transmitting the response message to the first controller and controlling the first controller to provide the first communication service to the terminal over the second communication system according to the response message, and
if the first communication service is received from the second controller, transmitting, to the first controller, the first communication service using a medium access control (MAC) layer and a physical layer associated with the first communication system, wherein an interworking unit comprises a MAC layer and a physical layer associated with each of the first and second communication systems.

12. The method of claim 11, wherein each of the first request message and the second request message is a registration request message, and the response message is a registration response message.

13. The method of claim 11, wherein the first communication system is an IEEE 802.11 communication system and the second communication system is an IEEE 802.16 communication system.

14. The method of claim 11, wherein the first controller comprises an access point controller.

15. The method of claim 11, wherein the second controller comprises an access control router.

16. An apparatus for providing a communication service, the apparatus comprising:
a receiver configured to receive a first request message indicating that a terminal is required to receive a first communication service over a second communication system providing a second communication service, from a first controller of a first communication system providing the first communication service, if a load of traffic occurs in the first communication system;
a transmitter configured to transmit a second request message to a second controller of the second communication system, the second request message indicating that the second controller is required to provide the first communication service to the terminal, and transmit the response message to the first controller, if a response message corresponding to the second request message is received from the second controller; and a controller configured, if the response message corresponding to the second request message is received from the second controller, to control the first controller to provide the first communication service to the terminal over the second communication system according to the response message, and if the first communication service is received from the second controller, transmit, to the first controller, the first communication service using a medium access control (MAC) layer and a physical layer associated with the first communication system, wherein an interworking unit comprises a MAC layer and a physical layer associated with each of the first and second communication systems.

17. The apparatus of claim 16, wherein each of the first request message and the second request message is a registration request message, and the response message is a registration response message.

18. The apparatus of claim 16, wherein the first communication system is an IEEE 802.11 communication system and the second communication system is an IEEE 802.16 communication system.

19. The apparatus of claim 16, wherein the first controller comprises an access point controller.

20. The apparatus of claim 16, wherein the second controller comprises an access control router.

* * * * *